March 20, 1962

M. J. BERARDI 3,025,831

LOBSTER TANK WITH ARTIFICIAL OCEAN WATER
AND A FILTER THEREFOR

Filed Dec. 24, 1958

INVENTOR
MARTIN J. BERARDI

March 20, 1962  M. J. BERARDI  3,025,831
LOBSTER TANK WITH ARTIFICIAL OCEAN WATER
AND A FILTER THEREFOR
Filed Dec. 24, 1958  2 Sheets-Sheet 2
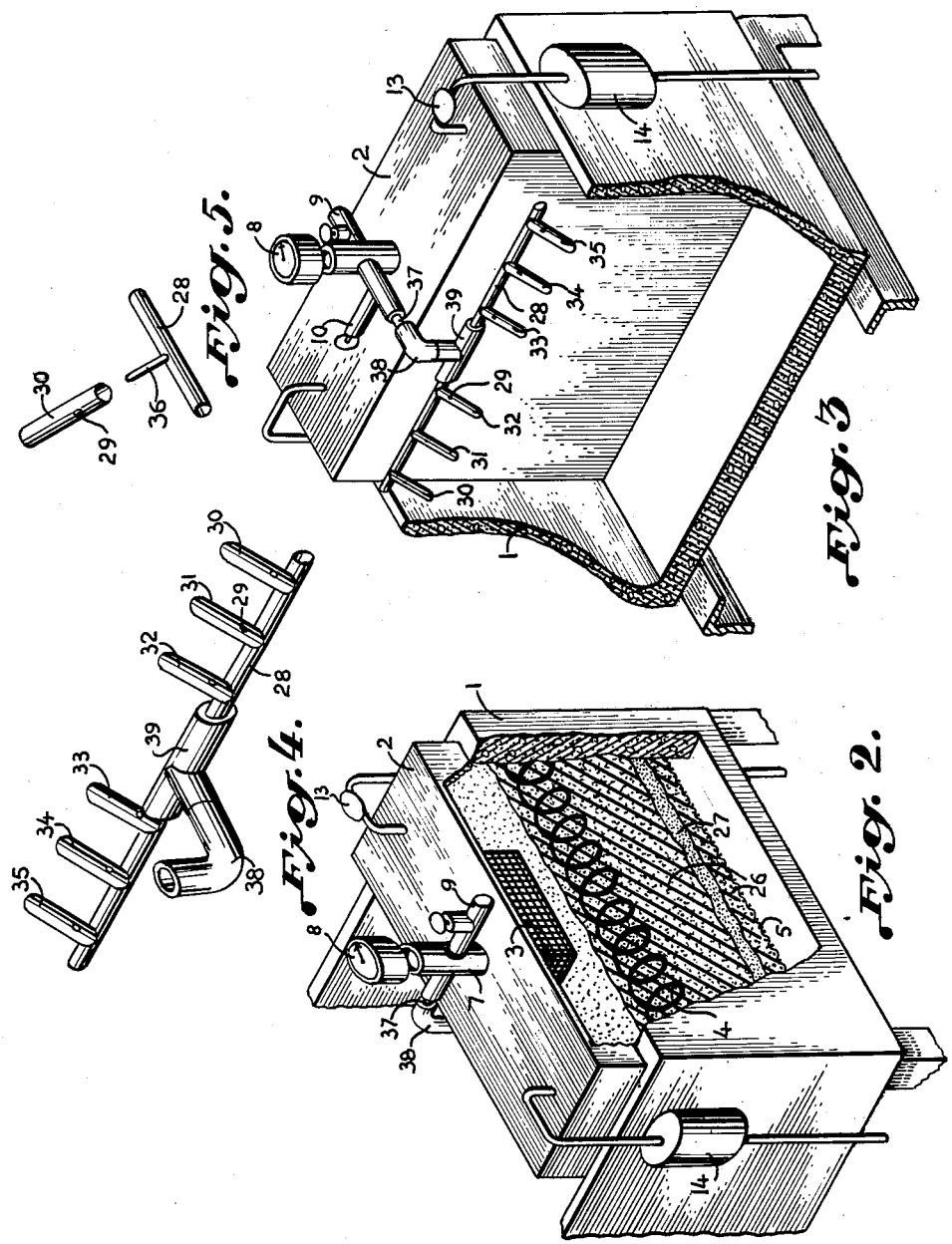
INVENTOR
MARTIN J. BERARDI

United States Patent Office 3,025,831
Patented Mar. 20, 1962

3,025,831
LOBSTER TANK WITH ARTIFICIAL OCEAN
WATER AND A FILTER THEREFOR
Martin J. Berardi, 53 Fowler Ave., Newburgh, N.Y.
Filed Dec. 24, 1958, Ser. No. 782,896
3 Claims. (Cl. 119—2)

This invention relates to an apparatus which will keep lobsters alive for a very long period of time. This apparatus consists of a tank, artificial ocean water, which in part of this invention, and a filtering system which creates oceanic conditions within the tank where the lobsters are kept.

Many inventions have been made which pertain to keeping aquatic creatures alive, including lobsters, for use in restaurants so that they will be edible at a given date. All the efforts that have been made heretofore to keep lobsters for any long period of time have shown many deficiencies, which I have overcome. One of these deficiencies is the fact that a one inch lobster could not survive more than, roughly, one hour in a tank type container in captivity. The conditions for such very small lobsters have to be just right and my invention creates such a condition so that lobsters even that small may survive for a number of days and start to grow.

Liquid filters other purifying devices and filtering devices have been developed heretofore to keep lobsters in a body of water, preferably ocean water. I have developed in this invention artificial ocean water which may be kept purified by a special filter of this invention at all times and so become the water in a container for lobsters or the like to keep them for a very long period of time so that one is not subjected to the market fluctuation in price of such lobsters in periods when one could not keep them alive heretofore.

It is primry object of this invention to provide artificial ocean water conducive to the life of the lobster, or any other salt water fish, without having to change such water in a tank by virtue of a filter, except for such addition of water as may be needed due to evaporation.

It is a further object of this invention to provide for such water in a lobster tank the chemicals for a filter which do not require any change within such filter except when foreign chemicals, such as chlorine for example, should become a foreign matter in the artificial ocean water and thereby be detrimental to the life of the aquatic creatures in said tank.

It is is a further object of this invention to provide a tank with artificial ocean water in combination with a chemical filter wherein the water, as it is being filtered, gets a proper temperature control which will permit lobsters in their infancy to survive and to grow, which was not possible heretofore.

Another object of this invention is to provide a chemical solution which makes it possible to wash and clean lobsters of sawdust and other packing materials, without hurting their health, prior to putting them into a tank of my invention so that they may be kept in a condition to continue to stay alive.

It is another object of this invention to provide a filter for natural or artificial ocean water to keep such water clean for an indefinite period of time.

It is a further object of this invention to have a tank for aquatic creatures, such as lobsters or the like, wherein the circulation of the water is similar to the motion of the natural ocean, namely that the water to be filtered is being picked from the bottom of the tank and that, by wave action, the freshly oxidized water is being put within the surface area of the circulating water in the tank.

Another object of this invention is to facilitate hatcheries, food supply houses and restaurant chains to keep lobsters or the like alive at all times so that they do not have to dispose of their supply under unfavorable market conditions.

Furthermore, it is another object of this invention to provide a lobster tank with water, filter and circulation wherein no additions of chemicals are necessary to keep lobsters alive and in healthy conditions for a considerable period of time and wherein, when food is added, they can live and even grow under much better conditions than known heretofore.

It is another object of the invention of my lobster tank with a filter and a circulator wherein current is created in the water by virtue of said circulating mechanism, like the motion of the ocean, against which motion a lobster has to exercise and to fight in order to survive and stay healthy and which motion also removes the waste from said lobster by the constant current created by the circulating mechanism.

It is a further object of this invention to have within the lobster tank with its artificial water a filtering system and circulating system with a control which circulates the water at all times in order to maintain a temperature of between 46° to 50° F.

Other objects and features of the invention will be set forth hereinafter more specifically.

The full nature of the invention will be understood from the accompanying drawings and the following specifications and claims wherein:

FIG. 2 is a partial isometric drawing of the filter unit with a sprinkler type spout unit which is preferably used in the invention but not shown in FIG. 1;

FIG. 3 is another isometric view of the filter looking from the tank side and thereby giving a better view of the sprinkler type spout unit and its connection to the filter outlet;

FIG. 4 is another isometric view showing the special sprinkler type spout unit which is preferably used in the invention;

FIG. 5 is a partial isometric drawing of the sprinkler type spout unit pipe with one of its attached water spigots and separated therefrom the spout unit which fits over the water spigot.

Now, referring specifically to the drawings wherein like reference characters have been used thruout the several views to designate like parts:

Figure 1:
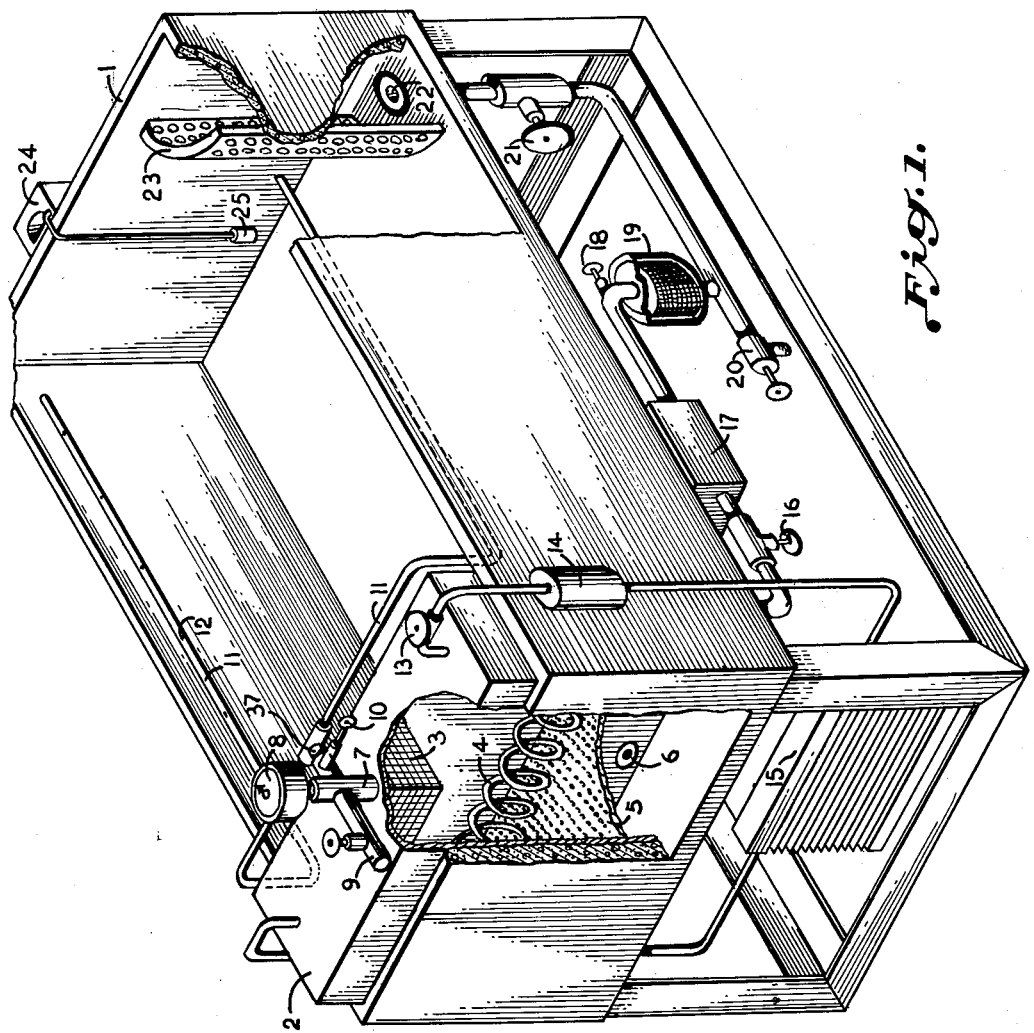
FIG. 1 is an overall isometric assembly view of one form of the invention.

In FIG. 1 I have the main tank portion 1 which may be made out of wood, plastic, glass or such materials as are suitable for this purpose. I prefer to use wood (in 2" thickness) or a wood base with a glass wall, depending on where such tank 1 is going to be located. If the tank should merely serve the purpose of keeping the aquatic creatures alive, a wooden tank structure is satisfactory. However, should such a tank be serving not only the purpose of keeping lobsters or the like alive but also to exhibit same, the glass walls would be preferable. The tank portion 1, on one of its ends, has an encased filter 2 which may be of stainless steel or such other material which would not be subject to deterioration by the chemicals which are used in the filter nor by the artificial ocean water which goes thru the filter before entering the tank. For better observation of the inside of the filter in FIG. 1 a portion of the wall of of the encasement of the filter 2 and the tank wall 1 have been left open to give a clearer view of what is happening in there. On the bottom of the filter inside there is a portion where the water has an inlet 6 to the filter 2. Above the air space created for the water and above the inlet 6 is a baffle 5 which facilitates distributing the water evenly thru the filter by virtue of the fact that it is a sieve-like portion extending across the whole inside of the filter and above the water inlet portion 6 and above the filter case base. A refrigeration coil 4 is also going thru the whole length of the filter and is located above the baffle 5 to assure that the water, prior to being redistributed after filtering, is of the proper temperature. The filter outlet 7 is extended upwardly from the filter on the outside and extends finally into the thermometer 8 which is an extra thermostatic control for the water temperature. On the upper inside of the filter portion 2 immediately under the filter outlet 7 there is located a screen 3 which may be square, round or rectangular. This screen 3 prevents the filter chemicals, which are not shown in FIG. 1 but are shown in FIG. 2, from entering the filter outlets 7 and 10, respectively, and thereby prevents these filter chemicals from entering the artificial ocean water in the tank 1.

To facilitate understanding of my invention I am going to give some proportions as an example, which apply directly to the tank 1 which is illustrated in FIG. 1. The total length of the tank itself is 60″ long by 24″ wide by 15″ high. These dimensions include the tank itself plus a filter portion 2. In the example given here in a tank of 60″ by 24″ by 15″ the filter unit will take up 7″ of the 60″ or be of the dimensions 7″ by 24″ by 15″.

Now to FIG. 2 which further explains the filter portion. In FIG. 2 is shown a part of the tank portion 1, a filter wall 2, a screen to keep the chemicals in the filter 3, a lower portion thru which the water enters and immediately above thereon the baffle 5 and between said baffle 5 and upper filter wall 2 there is a refrigeration coil 4. The filter chemicals in a size filter mentioned above, namely 7″ by 24″ by 15″, are put immediately above the baffle 5, the latter of which is 1″ from the bottom portion of the filter. Immediately above baffle 5 I put 3″ of $MgS_1O_3$ or any other manganese treated siliceous material such as is sold under the trade name of Culsorb mineral. Then add 3″ of an aqha chark mineral which is a straight activated carbon of a phenol value of 20 p.p.m. plus or minus 10%, according to American Water Works specification AWWA B–600–53.

Then, above these 3″ of aqua chark mineral I put some more of $MgS_1O_3$ up to the bottom of screen 3 but with the latter amount of $MgS_1O_3$ we mix 1 lb. of NaCl and 2 drops of iodine solution prior to putting this portion of the chemical into the filter. In FIG. 2 the $MgS_1O_3$ is designated as 26 and the aqua chark mineral as 27.

In the tank described in FIG. 1, for which I will give a 60 gal. formula as example, I keep artificial ocean water consisting of the following ingredients:

60 gals. of water—($H_2O$)
12 lbs. 10 ozs. sodium chloride—(NaCl)
1 lb. 4 oz. magnesium chloride—($MgCl_2$)
1 lb. 10 oz. magnesium sulphate A.S.—($MgSO_4$)
½ oz. potassium chloride—(KCl)
14½ oz. calcium chloride—($CaCl_2$)
½ oz. sodium bicarbonate—($NaHCO_3$)
½ oz. sodium bromide—(NaBr)
10 ozs. sodium acid sulphate—($NaHSO_4$)
3 drops iodine solution—(I)

The 60 gals of water mixed with the ingredients mentioned herein make up the artificial ocean water of my invention which I use for a tank of the size described above. Naturally, the size of the tank and the size of the filter are not limited to the dimensions which I have given but these dimensions are rather given to make it easier for the reader of this invention to understand the proportions of the materials necessary to be taken for a given size tank in order to have the invention perform successfully.

A refrigeration unit 25 underneath the tank or somewhere in the neighborhood of the tank is necessary to obtain the desired water temperature. This water temperature, in turn, is set by the thermometer of the thermostat 8 and the thermostat should be set so that the water is never colder than 46° F. nor warmer than 50° F. Another thermostat 24 is shown in FIG. 1 with a thermostat bulb 25 which is in the tank itself. The thermostat 8 is more of a thermometer control to show the actual temperature of the water going back into the tank, whereas thermostat 24 is to control the water in the tank so that it does not become warmer than 50° F.

To fully understand the total scope of my invention I now explain again FIG. 1 with modifications not disclosed heretofore. I explain this with the understanding that the size of the tank and the size of the filter are variable. I will follow thru with the example of a tank size 24″ x 60″ x 15″.

To operate a lobster tank complete with filter I do as follows in my invention:

Fill the lobster tank 1 with the necessary gallons of water and add sufficient of the chemical solution described above to obtain artificial ocean water.

Turn on the thermostat 24 with the thermostatic bulb 25 within the tank and allow the water to cool to a temperature of 46°. Turn on the compressor (not shown), start the circulating pump 17, close valve 9, open valve 10, set the pressure control valve 13, turn on the refrigeration unit 15, close valve 18, close valve 20, insert screen 23 in the corner where the tank outlet 22 for the water is located and open valve 21. The water now will circulate in the following manner. The water will go thru screen 23 to protect the outlet 22 from clogging up. The water will flow thru outlet 22 and pass by open valve 21 thru the pipe which extends into the closed valve 20. Since that valve is closed the water will go thru the large particles filter 19 where the water enters thru the bottom, flows thru the screen and comes out the top where this large particles filter 19 is connected by the pipe to the pump 17.

It is this pump 17 which circulates the water and from there it goes thru a pipe bypassing the open valve 16 going thru a refrigerant filter 14 which is controlled by pressure control valve 13 and from there goes thru the refrigeration unit 15 and the water comes out at the filter inlet 6. Here the water continues to be pumped thru to the valve 10 to which in FIG. 1 are connected two small diameter tubes 11 extending along each side of the tank. These tubes are slightly above the water level and have small holes 12 in them thru which the water gets sprayed back into the tank after it is filtered.

The spraying of water onto the surface of a tank is no novelty and is not claimed as such in this application. As a matter of fact, I found that spraying this water back onto the surface of the water level is not the most satistory manner to keep aqueous creatures, such as lobsters, for a very long time. However, if one only wants to keep these lobsters for two or three weeks this type of spraying the water onto the surface of the water level will be satisfactory. But it is the object of my invention to keep lobsters alive and healthy for a much longer time and therefore I have shown in FIGS. 3, 4 and 5 the preferred form by which I introduce the water back into the tank. This is done in the following manner:

Now, referring to FIG. 3, an elbow piece of pipe 38 is attached by a nipple 37 to the filter outlet with valve 10 on one side and to a T pipe 39 on the other side. To this T pipe is attached one sprinkler type spout unit with spouts 30, 31 and 32 on one side of T pipe 39 and spouts 33, 34 and 35 on the other side of T pipe 39. These outlets are sufficient for a 60 gal. tank and more outlets, proportionately, will be needed for larger sized tanks.

In FIG. 3 we have an open part of the tank immediately on the outside of the filter against the inside of the tank. Here a nipple 37 extends to the elbow piece of the pipe 38 to permit the water to flow back into the tank when valve 10 is open. The bottom part only of spouts 30, 31, 32, 33, 34 and 35 will be in the water and each individual spout is more particularly illustrated in FIG. 5. Here it is shown how the air is being picked up by the filtered water before it goes back into the tank. In FIG. 5 there is shown part of the sprinkler type spout unit 28 with a small water spigot 36 over which one of the spouts, 30, fits. On the upper part of all spout units 30, etc., above the water level is an air vent 29. As the water flushes from the spigot 36 thru the spout 30 it picks up oxygen from the air vent 29 and the aerated water finally discharges into the water tank beneath the level of the water, by virtue of the spouts 30, etc. which are immediately below the surface of the water. This creates the kind of surface wave motion which results in producing a motion generally known to be taking place on the bottom of the ocean. In order to have this motion in a tank containing 60 gallons of water, said water must circulate at the rate of at least 4 gallons per minute. Five spouts 30, etc. (or spray jets) with a $3/16''$ air vent in each are the minimum requirement and will supply sufficient oxygen in a 60 gallon tank to keep 50 to 75 lobsters alive for a long, long time. Six spouts 30, etc., however, will be more satisfactory since water from six spouts will create more current than water from five spouts. The circulating pump 17 and the refrigeration unit 15 are of the utmost importance since the water must circulate at the rate of at least four gallons per minute and the temperature can vary no more than from 46° to 50° F.

Assuming the lobsters or other aqueous creatures have been kept in the tank for numerous months and the filter has become quite filled with waste and foreign matter, the water still does not have to be changed but the filter 2 can be back-flushed in the following manner:

Close valve 21, open valve 20, open valve 9, close valve 10, open valve 13, open valve 16, shut off circulating pump 17, temporarily open valve 18, which is an air bleeder valve, and leave out air, close valve 18 and attach to the pipe of the now open valve 9 a hose thru which you back-flush the filter and, due to the open valve 20, all the excess waste will drain out during the back-flushing. This back-flushing should be done in a tank of the above-described example size for approximately 20 minutes to make certain that by the back-flushing all foreign and waste materials are being eliminated from the filter and the filter is cleaned sufficiently. Make sure that the water in the tank is kept at the necessary temperature for the period of time during which the filter is being back-flushed and after this back-flushing operation valve 9 is closed, valve 10 is open, valve 16 is open, valve 20 is closed and valve 21 is open, pump 17 is turned on, pressure control valve 13 is set in place and the water will now begin to circulate as it did prior to the back-flushing operation.

If lobsters or the like are to be kept alive for a long period of time they should be fed one-fifth of an ounce per week per each pound of lobster. This food may consist of ground up bass liver, cut up clams or "liver B and folic acid food supplement" as is generally known by hatcheries and fisheries.

Obviously, many variations and modifications of the present invention are possible in the light of the above teachings. It is, therefore, to be understood that within the scope of the appended claims the invention may be practiced otherwise than as specifically described.

Having thus described the invention what I claim as new and desire to secure by Letters Patent is:

1. A tank unit particularly adapted for keeping lobsters alive, said tank unit comprising an open top tank containing artificial sea water; an outlet in the tank; a pump connected to said outlet; a filter assembly; conduit means connecting the outlet of the pump to the filter assembly at the lower portion thereof; an outlet in the upper portion of the filter assembly; mixing discharge means connected to the filter outlet immediately below the surface of the water in the tank for aerating the filtered water and introducing said aerated water into the tank so as to induce surface wave motion of the water within the tank simulating that taking place on the ocean bottom and thus stimulate the lobsters to cause them to move about within the tank.

2. The invention as described in claim 1 wherein the means for aerating the filtered water and introducing said aerated water into the tank immediately below the surface of the water comprises a plurality of nozzles to which the filtered water is fed, each nozzle having its outlet extending into the tank water immediately below the surface thereof and at least one air inlet in the nozzle above the water level to allow air to be drawn into the moving water stream.

3. The invention as described in claim 2 wherein the filter assembly includes an inlet in the lower portion, an outlet in the upper portion, filtering material within the filter assembly adjacent the inlet and a cooling coil running through the filtering material to cool the filtered water.

References Cited in the file of this patent

UNITED STATES PATENTS

| | | |
|---|---|---|
| 803,178 | Leyson | Oct. 31, 1905 |
| 1,248,169 | Schnoor | Nov. 27, 1917 |
| 2,105,278 | Van Der Minne | Jan. 11, 1938 |
| 2,286,146 | Look | June 9, 1942 |
| 2,302,336 | MacDonald | Nov. 17, 1942 |
| 2,338,500 | Felsch | Jan. 4, 1944 |
| 2,563,364 | Proctor | Aug. 7, 1951 |
| 2,594,474 | McGrath | Apr. 29, 1952 |
| 2,672,845 | Schneithorst | Mar. 23, 1954 |
| 2,890,680 | Malkin | June 16, 1959 |
| 2,893,958 | Phillips | July 7, 1959 |